United States Patent
Nabata et al.

(10) Patent No.: US 8,618,939 B2
(45) Date of Patent: Dec. 31, 2013

(54) MOBILE ELECTRICAL DEVICE

(75) Inventors: Toshihisa Nabata, Yokohama (JP); Toshikazu Hiramoto, Yokohama (JP)

(73) Assignee: KYOCERA Corporation, Kyoto (JP)

(*) Notice: Subject to any disclaimer, the term of this patent is extended or adjusted under 35 U.S.C. 154(b) by 194 days.

(21) Appl. No.: 13/014,350

(22) Filed: Jan. 26, 2011

(65) Prior Publication Data

US 2011/0181421 A1 Jul. 28, 2011

(30) Foreign Application Priority Data

Jan. 27, 2010 (JP) ................................. 2010-015973

(51) Int. Cl.
*G08B 23/00* (2006.01)
*G08B 3/10* (2006.01)
*A61B 5/08* (2006.01)

(52) U.S. Cl.
USPC ............... 340/573.1; 340/384.3; 600/529; 600/530; 600/532; 600/534

(58) Field of Classification Search
USPC ................................................ 600/529–534
See application file for complete search history.

(56) References Cited

U.S. PATENT DOCUMENTS

| | | | | |
|---|---|---|---|---|
| 4,665,385 | A * | 5/1987 | Henderson | 340/539.26 |
| 4,853,854 | A * | 8/1989 | Behar et al. | 700/295 |
| 4,868,545 | A * | 9/1989 | Jones | 340/573.1 |
| 6,606,997 | B2 * | 8/2003 | Brue | 131/270 |
| 6,858,182 | B1 * | 2/2005 | Ito et al. | 422/416 |
| 6,992,580 | B2 * | 1/2006 | Kotzin et al. | 340/539.11 |
| 7,872,574 | B2 * | 1/2011 | Betts et al. | 340/539.26 |
| 2003/0017440 | A1 * | 1/2003 | Bergey et al. | 434/262 |
| 2004/0002843 | A1 * | 1/2004 | Robarts et al. | 703/13 |
| 2007/0016092 | A1 * | 1/2007 | Shaw et al. | 600/532 |
| 2007/0208536 | A1 * | 9/2007 | Spector et al. | 702/182 |
| 2009/0181640 | A1 * | 7/2009 | Jones | 455/404.2 |
| 2009/0186596 | A1 * | 7/2009 | Kaltsukis | 455/404.2 |

FOREIGN PATENT DOCUMENTS

| | | |
|---|---|---|
| CN | 1672182 A | 9/2005 |
| JP | 2001-313696 A | 11/2001 |
| JP | 2002-64595 A | 2/2002 |
| JP | 2007-135008 A | 5/2007 |
| WO | 2004/012033 A2 | 2/2004 |

* cited by examiner

*Primary Examiner* — Daniel Wu
*Assistant Examiner* — Emily C Terrell

(57) ABSTRACT

A mobile electronic device comprising an odor sensor and methods of operation are disclosed. An odor is detected using an odor sensor coupled to the mobile electronic device, and a predetermined process is performed if the odor is a predefined odor.

19 Claims, 3 Drawing Sheets

MOBILE ELECTRICAL DEVICE

CROSS-REFERENCE TO RELATED APPLICATION

The present application claims priority under 35 U.S.C. §119 to Japanese Patent Application No. 2010-015973, filed on Jan. 27, 2010, entitled "MOBILE ELECTRICAL DEVICE". The content of which is incorporated by reference herein in its entirety.

FIELD

Embodiments of the present disclosure relate generally to mobile electrical devices, and more particularly relate to a mobile electrical device operable to detect odor.

BACKGROUND

When a smoker attempts to stop smoking, obstacles such as nicotine withdrawal and anxiety stress caused by ending a series of smoking habits may prevent the smoker from continuing to stop smoking. Persons who attempt to stop smoking may deal with those obstacles on their own. Specifically, they may simply keep resisting; distract themselves by using a pseudo smoking tool in which a fragrance such as mint, and the like, are formed in a shape of a cigarette, or use gums or nicotine patches that allow them to take a small amount of nicotine while reducing or stopping smoking.

There is a non-smoking support device that displays messages (e.g., encouraging smokers not to smoke) that support a will power of a person attempting to quit smoking. With such a non-smoking support device, persons giving up smoking may voluntarily measure a composition of their breath or maintain their will by reading the messages that encourage them to quit smoking. Success giving up smoking depends on the will power of persons giving up smoking rather than the non-smoking support device. Therefore, a non-smoking support device that does not depend on the will power of persons giving up smoking is desired.

SUMMARY

A mobile electronic device and method for detecting an odor is disclosed. An odor is detected using an odor sensor coupled to the mobile electronic device, and a predetermined process is performed if the odor is a predefined odor.

In an embodiment, a mobile electronic device comprises an odor sensor operable to detect a predefined odor. The mobile electronic device also comprises a control module operable to perform a predetermined process, if the predefined odor is detected.

In another embodiment, a method for operating a mobile electronic device detects an odor using an odor sensor coupled to the mobile electronic device, and performs a predetermined process, if the odor is a predefined odor.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a simulated fake communication call on a foldable mobile phone. Embodiments of the disclosure, however, are not limited to such mobile phone, and the techniques described herein may also be utilized in other applications. For example, embodiments may be applicable to digital books, digital cameras, mobile electronic game devices, digital music players, personal digital assistance (PDA), personal handy phone system (PHS), lap top computers, mobile TV's, GPS's or navigation systems, wired or wireless mobile communication device, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
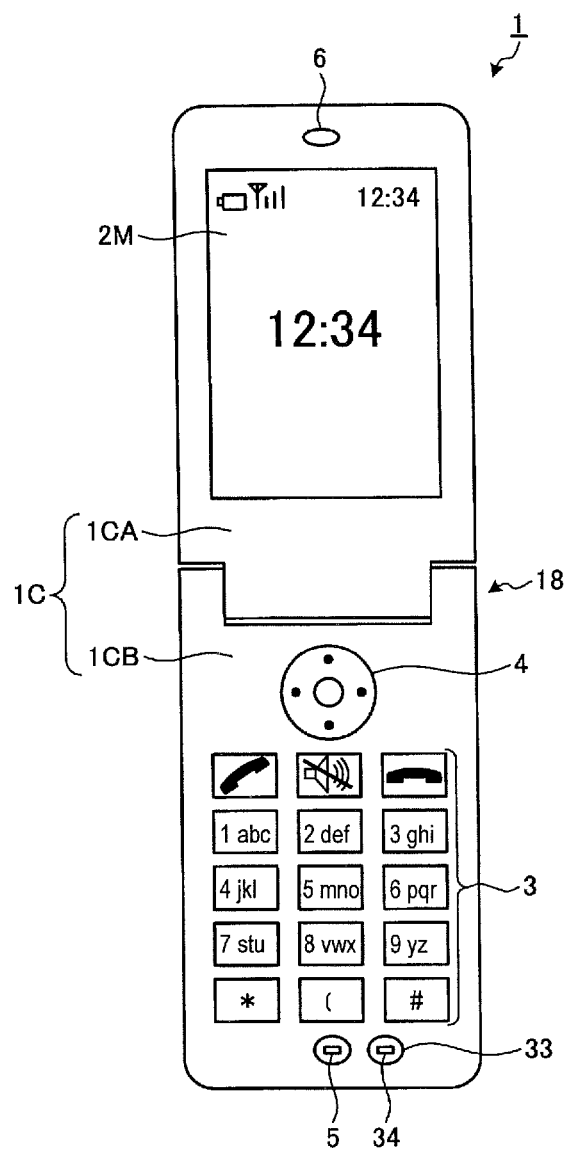
FIG. 1 is an illustration of an exemplary front view of a mobile electrical device in an open state according to an embodiment of the disclosure.

FIG. 1 is an illustration of an exemplary front view of a mobile electrical device 1 in an open state according to an embodiment of the disclosure. The mobile electronic device 1 may comprise a mobile handset. The mobile electronic device 1 (mobile handset 1) may comprise a flip type mobile handset. That is, a component 1C may be opened or closed with a first component 1CA and a second component 1CB.

A main display module 2M is provided in the first component 1CA. The main display 2M may display a standby screen as a predetermined image while the mobile handset 1 is in a state of waiting to receive a call. Alternatively, the main display 2M may display a menu image that is used to support an operation of the mobile handset 1. A receiver 6 is provided in the first component 1CA, and is configured to generate an audio during a call, during playing music, and the like.

Figure 2:
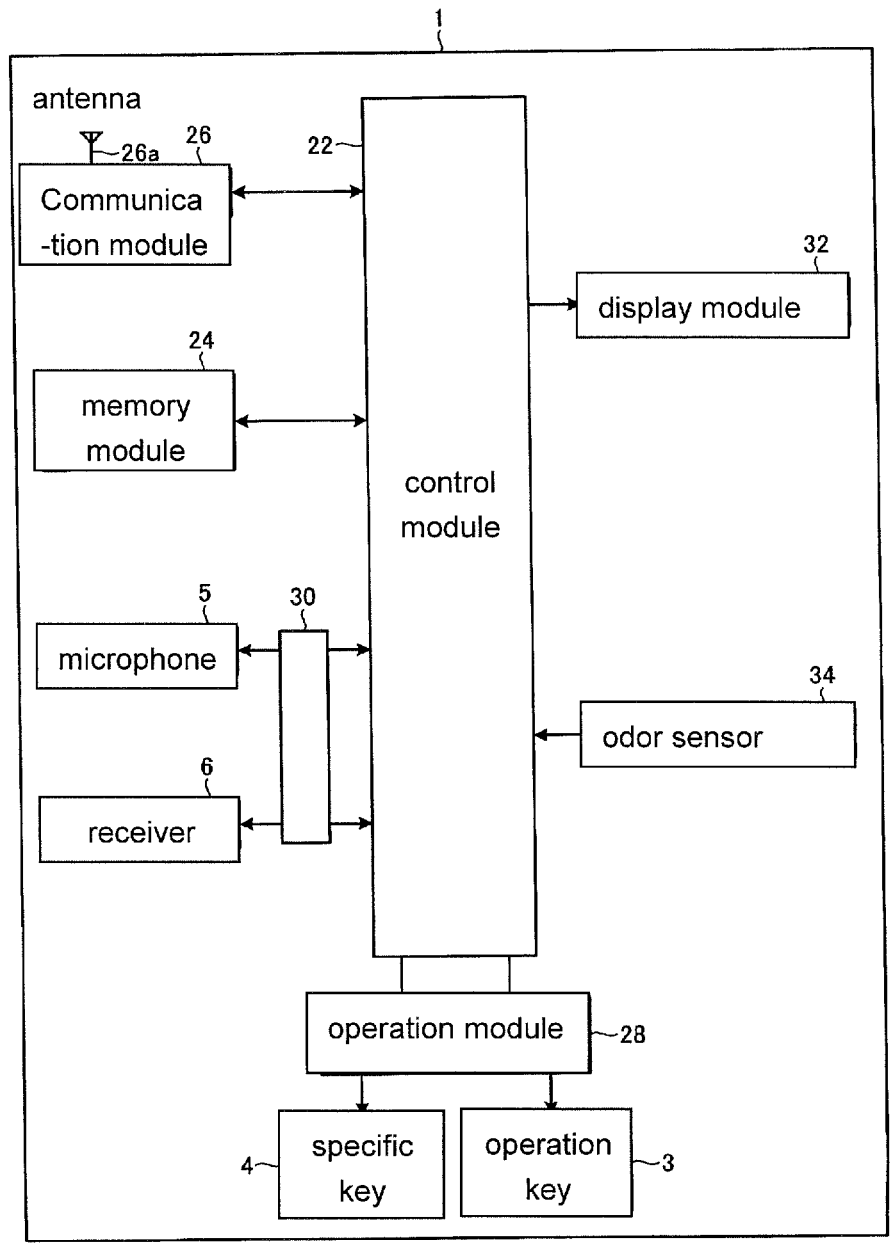
FIG. 2 is an illustration of an exemplary functional block diagram of the mobile electrical device shown in FIG. 1.

A plurality of operation keys 3 are provided in the second component 1CB, and are configured to enter, a phone number of an intended party, letters when composing a message, and the like. A key 4 is configured to select and confirm menus that are displayed on the main display 2M, scroll of the main display 2M, and the like. Operation keys 3 and the key 4 are provided in an operation module 28 (FIG. 2). A microphone 5 configured to receive an audio during a call to the mobile handset 1 is provided in the second component 1CB. A small opening 33 is formed in a proximity to the microphone 5. An odor sensor 34 configured to detect odor, is provided in the small opening 33.

Odor comprises, for example but without limitation, cigarette odor, nicotine odor, tar odor, food odor, perfume odor, alcohol odor, drug odor (e.g., cannabis), oral malodor odor (e.g., volatile sulfur compound, methyl mercaptan), and the like. Thus, abstinence support and rehabilitation support may be provided. In addition, the odor sensor 34 may be provided, for example but without limitation, in proximity to the microphone 5, the operation keys 3 or the specific key 4 of the operation module 28, receiver 6 (speaker), the main display module 2M, and the like. Thus, cigarette odor that is attached to the user's fingers may be detected. The odor may also be detected from other body parts of the user, such as but without limitation, hand, finger, hair, skin, nose, eyes, and the like.

In this document the proximity means close enough to detect an odor during a call, and the like, or close enough for breaths to reach the opening 33, and it is not necessary for the opening 33 to be adjacent to the microphone 5.

The first component 1CA and the second component 1CB are coupled via a hinge 18. The first component 1CA and the second component 1CB revolve around the hinge 18 and are constituted such that they can revolve in a direction away from each other and in a direction approaching each other. The mobile handset 1 opens when the first component 1CA and the second component 1CB revolve in the direction away from each other and the mobile handset 1 closes when the first component 1CA and the second component 1CB revolve in the direction approaching each other.

FIG. 2 is an illustration of an exemplary functional block diagram of the mobile electrical device 1/mobile handset 1 (system 200) shown in FIG. 1. The mobile handset 1 comprises a control module 22, a memory module 24, a communication module 26, an operation module 28, an audio processing module 30, a display module 32, and an odor sensor 34.

A practical system 200 may comprise any number of input modules, any number of processor modules, any number of memory modules, and any number of display modules. The illustrated system 200 depicts a simple embodiment for ease of description. These and other elements of the system 200 are interconnected together, allowing communication between the various elements of system 200. Those of skill in the art will understand that the various illustrative blocks, modules, circuits, and processing logic described in connection with the embodiments disclosed herein may be implemented in hardware, computer-readable software, firmware, or any practical combination thereof.

To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The control module 22 is configured to support functions of the system 200. The control module 22 may control operations of the system 200 so that processes of the system 200 are suitably performed. The control module 22 performs a predetermined process if the predefined odor is detected. For example, the control module 22 comprises two modes, namely scheduler mode and observation mode as explained in more detail below. In these modes the control module 22 causes the odor sensor 34 to start operating during a communication performed by a communication module 26, controls the display module 32 and the receiver 6 to perform prompting operations, and the like.

For another example, the control module controls the display module 32 to display an incoming image for a fake incoming call in order to facilitate the user to perform an operation. For another example, the control module 22 controls the receiver 6 to output audio. For yet another example, the control module 22 controls the communication module 26 to send an email to a predefined communication receiver that the user may have smoked.

Additionally, the control module 22 accesses the memory module 24 such as access to input data such as, but without limitation, odor identification data, odor threshold value, time of day, preset time values, time intervals, addresses, phone numbers, emails address, and the like. The control module 22, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration. In practice, the control module 22 comprises processing logic that is configured to carry out the functions, techniques, and processing tasks associated with the operation of the system 200. In particular, the processing logic is configured to support operation of the odor sensor 34, and the communication module 26 to facilitate certain operations performed by a user as explained in more detail below.

The memory module 24 may be any suitable data storage area with suitable amount of memory that is formatted to support the operation of the system 200. The memory module 24 may comprise application programs or data that are used for processing in the control module 22. Application programs may comprise, for example but without limitation, an application program that performs internet communication, an application program that receives and sends messages, an application program that plays audio data, an application program that calls, receives calls, and processes calls, an application program that processes TV transmission, and the like.

The memory module 24 is configured to store, maintain, and provide data as needed to support the functionality of the system 200 in the manner described below. For example, the memory module 24, stores data such as, but without limitation, odor identification data, a time of day, a previously set time value, time intervals, an email address, image data, audio data, dictionary data for converting characters, address book data, an odor threshold value, and the like. In practical embodiments, the memory module 24 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory module 24 may be coupled to the control module 22 and configured to store, for example but without limitation, the input parameter values and the output parameter values corresponding to the an odor detection scenario.

The communication module 26 is operable to transmit and receive a plurality of communication signals comprising data signals via a base station. The communication module 26 communicates with the wireless network via a wireless data communication link (not shown). The communication module 26 cooperates with a base station transceiver (not shown) with a suitably configured RF antenna arrangement 26a that can support a particular wireless communication protocol and modulation scheme to transmit and receive the data signals form and to the control module 22. The data signals may comprise, for example but without limitation, voice data during voice communication, image signal, text data during email, web data during accessing web site, and the like. The wireless communication protocol and modulation scheme may comprise, for example but without limitation, Code Division Multiple access (CDMA), and the like.

The operation module 28 is constituted by the operation keys 3 in which various types of functions such as a power key, a call key, a numerical key, a character key, a direction key, a confirmation key, and a send key are assigned and by the specific key 4, and when a user operate these keys, signals corresponding to the operations are sent. Sent signals are input to the control module 22 as a user command.

The audio processing module 30 (audio module) processes audio signals that are input by the microphone 5 and processes audio signals that are output by the receiver 6. That is, the audio processing module 30 amplifies audio that are input by the microphone 5, processes signals such as encoding after executing an AD conversion, and outputs to the control module 22 after converting to digital audio data. Audio data that is sent from the control module 22 is processed such as decoding, DA conversions, and amplifications and output to the receiver 6 after converting to analog audio signal.

The display module 32 comprises the main display module 2M configured to display various kinds of information via an image/video signal supplied from the control module 22. The display module 32 may accept a user input operation to input and transmit data, and input operation commands for functions provided in the system 200. The display module 32 accepts the operation command, and outputs operation command information to the control module 22 in response to the accepted operation command. The display module 32 may be formed by, for example but without limitation, an organic electro-luminescence (OEL) panel, liquid crystal panel (LCD), and the like.

The odor sensor 34 detects a predefined odor. The odor sensor 34 operates depending on operation signals that are supplied by the control module 22 and generates a detection signal when the cigarette odor exceeding the predetermined threshold value is detected. Generated signal is input to the control module 22. In an embodiment, the odor sensor 34 may also be provided in proximity to keys with high frequency of use such as a call key or an end key.

Subsequently, a non-smoking support operation of the mobile handset 1 is explained. The odor sensor 34 is provided in the vicinity of the microphone 5. Therefore, when a user calls using the mobile handset 1, because a distance between the user's mouth and the odor sensor 34 becomes very short, during the call is suitable to detect odor of the user's mouth at a previously set time. Thus, the control module 22 operates the odor sensor 34 when the communication module 26 sends or receives a call or makes a call, and detects whether or not there is cigarette odor in the user's mouth using the odor sensor 34.

If the odor sensor 34 detects the cigarette odor, the control module 22 controls the communication module 26 to send an email informing a predefined communication receiver, for example, an observer of the user who is giving up smoking that the user smoked. The observer may be a family member or a person who provides specific health guidance to the user (smoker). Sending an email (or a message) to the predefined communication receiver may cause the user to feel that he or she must continue to give up smoking. The control module 22 can cause prompting an operation to be performed by the user at one or more previously set dates and times, and to cause the odor sensor 34 start operating. The prompting comprises, for example but without limitation, an audio, an image, a text, a vibration, and the like, as explained in more detail below.

In on embodiment, the control module 22 causes the prompting by causing the audio processing module 30 to generate audio informing of an effect, if the odor sensor detects the predefined odor. For example, if the odor sensor 34 detects the cigarette odor, the control module 22 controls the receiver 6 to output audio describing an effect that the user smoked even though he or she is trying to quit smoking to inform people around the mobile handset 1, for example outputting audio, specifically "I am trying to quit smoking." Generally, many persons attempting to quit smoking starts to give up smoking secretly without informing people around him or her of the fact that he or she started to give up smoking. This is because the persons who are trying to quit smoking protect themselves from being embarrassed by not publicizing about giving up smoking in case they fail to quit smoking. Therefore, as mentioned above, when the user smokes, audio informing surrounding people of the effect that the user smoked even though he or she is trying to quit smoking is output and by publicizing that the user is trying to quit smoking, user's sense of shame is used to make the user feel obliged to continue to give up smoking.

The control module 22 comprises at least two modes, namely a scheduler mode and an observation mode. In the scheduler mode, the control module 22 controls the receiver 6 to move a body part such as his or her mouth in proximity to the odor sensor 34 at least one previously set time or date.

In an embodiment, in the scheduler mode, the control module 22 causes the promoting by causing the display module 32 to display an image prompting the user to move his or her mouth close to the odor sensor 34, and operates the odor sensor 34 at the same time.

If the odor sensor 34 detects the cigarette odor, the control module 22 controls the communication module 26 to send an email informing the predefined communication receiver of the user smoked and controls the receiver 6 to output audio informing people around the mobile handset 1 that the user smoked despite that he or she is trying to stop smoking. Thus, by causing the user to move his or her mouth close to the odor sensor 34 at the previously set time, this may cause the user to feel obliged to continue to give up smoking.

Regardless of the prompt, when the user does not move his or her mouth close to the odor sensor 34, it is believed that there is a doubt that the user has smoked; thus, the control module 22 controls the communication module 26 to send an email informing the predefined communication receiver that the user may have smoked or controls the receiver 6 to output audio informing people around the mobile handset 1 of the effect that the user may have smoked despite that he or she is trying to quit smoking.

In this way, regardless of the prompt, when the user does not move his or her mouth close to the odor sensor 34, the user is made to feel obliged to continue to give up smoking by sending an email informing the predefined communication receiver that the user may have smoked. By outputting audio informing surrounding people of the effect that the user may have smoked, and by publicizing that the user is trying to quit smoking, the user's sense of shame is utilized making the user feel obliged to continue to give up smoking.

One or more time of day may be set separately for weekdays and weekends in consideration of the differences in user's living pattern during weekdays and weekend days. For example, time slot during which smoking is allowed on weekdays (e.g., daytime) and time slot during which smoking is allowed on weekends (e.g., all day) may be set and it can be such that the user is encouraged to operate during these time slots. In this manner, support for quitting smoking can be effectively provided depending on the user's living pattern.

The control module 22 also counts time of day starting at a predetermined time until a predetermined odor is detected. Therefore, a time interval can be set from one or more previously set time in the scheduler mode. For example, the time interval can be set from a start of quitting smoking until the odor sensor 34 detects the cigarette odor (time during which the user continues to quit smoking). The previously set times may be different between weekdays and weekends. The time interval can be displayed on the display module 32 informing the user of a time duration in which he/she continues to quit smoking. In this manner, the user may be encouraged to continue to give up smoking.

In the observation mode, the odor sensor 34 is operated when a call or an email is received from the predefined communication receiver when the odor sensor 34 detects the cigarette odor, the control module 22 controls the communication module 26 to send an email informing the predefined communication receiver that the user smoked. Monitoring the user in this manner can cause the user to feel obliged to continue to give up smoking. When the odor sensor 34 detects the cigarette odor, the control module 22 controls the receiver 6 to output audio informing people around the mobile handset 1 that the user smoked even though he or she is trying to quit smoking.

Thus, by publicizing that the user is trying to quit smoking, the user's sense of shame is used in order to make the user feel obliged to continue to quit smoking. If the user does not perform an operation (user operation) when he or she receives a call or an email from the observer, it is believed that there is a doubt that the user has smoked; thus, the control module 22 controls the communication module 26 to send an email informing the predefined communication receiver that the user may have smoked or the control module 22 controls the receiver 6 to output audio informing people around the mobile handset 1 that the user may have smoked despite that he or she is trying to quit smoking.

As mentioned above, when the user performs an operation input to the operation module 28, a distance between the user's mouth and the odor sensor 34 becomes close to a certain degree although the distance is not as close as it would be when he/she is making a call. This may be an ideal time to detect odor. Thus, when an operation input is received from the user at the operation module 28 when sending, receiving, viewing, or creating emails, or managing schedules, etc., the control module 22 may detect odor by operating the odor sensor 34. Based on this, cigarette odor of the user's mouth can be detected effectively and this can cause the user to feel obliged to continue to quit smoking.

The control module 22 may control the receiver 6 to ring a ringtone to make it seem as if a call or an email was received even though a call or an email is not actually received, and the control module 22 may control the display module 32 to display an incoming image (fake incoming call) in order to facilitate or prompt the user to perform an operation (user operation) and in order to detect odor by operating the odor sensor 34. This type of fake incoming call (fake communication) can cause the user to feel obliged to operate the mobile handset 1 and support for quitting smoking can be provided effectively. At this time, for example, a call from a person who called immediately before or a call from a person to whom the user called can be pretended. This process makes it difficult for the user to recognize that it is a fake incoming call.

Figure 3:
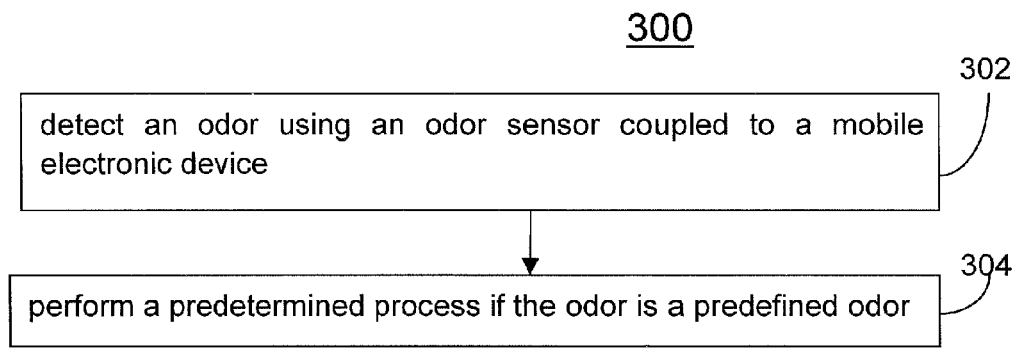
FIG. 3 is an illustration of an exemplary flowchart showing an odor detection process according to an embodiment of the disclosure.

FIG. 3 is an illustration of an exemplary flowchart showing an odor detection process according to an embodiment of the disclosure. The various tasks performed in connection with process 300 may be performed, by software, hardware, firmware, a computer-readable medium having computer executable instructions for performing the process method, or any combination thereof. The process 300 may be recorded in a computer-readable medium such as a semiconductor memory, a magnetic disk, an optical disk, and the like, and can be accessed and executed, for example, by a computer CPU such as the control module 22 in which the computer-readable medium is stored.

It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. For illustrative purposes, the following description of process 300 may refer to elements mentioned above in connection with FIGS. 1-2. In practical embodiments, portions of the process 300 may be performed by different elements of the system 200 such as: the control module 22, the memory module 24, the communication module 26, the display module 32, the odor sensor 34, the operation module 28, etc. Process 300 may have functions, material, and structures that are similar to the embodiments shown in FIGS. 1-2. Therefore common features, functions, and elements may not be redundantly described here.

Process 300 may begin by detecting an odor using an odor sensor 34 coupled to the mobile electronic device 1 (task 302).

Process 300 may then continue by performing a predetermined process if the odor is a predefined odor (task 304).

As explained above, when user has smoked or when there is a doubt that the user may have smoked, an email informing a predefined communication receiver of same is sent, and audio informing surrounding people of the effect that the user smoked or may have smoked despite that he or she is trying to quit smoking is output. In this manner, the user can continue to be motivated to quit smoking. Therefore, support independent of the will power of persons giving up smoking is provided.

The word "exemplary" is used herein to mean "serving as an example or illustration." Any aspect or design described herein as "exemplary" is not necessarily to be construed as preferred or advantageous over other aspects or designs.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile electronic device comprising:
   a microphone operable to receive a user voice input;
   a user interface for alerting a user of an incoming call;
   an odor sensor located adjacent to the microphone, and operable to detect at least one predefined odor of the user voice input when the microphone is receiving the user voice input; and
   a control module electrically coupled to the user interface, the microphone and the odor sensor, the control module operable to initiate a fake incoming call alert on the user interface when a communication is not actually received by the mobile electronic device, the control module further operable to cause the odor sensor to operate when the microphone is receiving the user voice input in response to the fake incoming call alert, and to perform a predetermined process if the at least one predefined odor is detected.

2. The mobile electronic device according to claim 1, wherein the control module is further operable to cause prompting the user to perform the user voice input at one or more previously set date and time.

3. The mobile electronic device according to claim 2, wherein the prompting comprises at least one prompt selected from a group of: audio and an image.

4. The mobile electronic device according to claim 3, further comprising an audio module, wherein the control module is further operable to cause the audio module to generate audio informing of an effect, if the odor sensor detects the predefined odor.

5. The mobile electronic device according to claim 3, further comprising an audio module, wherein the control module is further operable to cause the audio module to generate audio informing of not performing the user voice input, if the user does not perform the user voice input despite the at least one prompt.

6. The mobile electronic device according to claim 2, wherein the one or more previously set date and time comprises a first time on a weekday and a second time on a weekend day, wherein the first time and the second time are different.

7. The mobile electronic device according to claim 1, further comprising a communication module, wherein the control module is further operable to cause the odor sensor to start operating in response to an incoming phone call received through a communication network.

8. The mobile electronic device according to claim 7, wherein the communication comprises a voice communication, an email communication and an internet communication.

9. The mobile electronic device according to claim 7, wherein the control module is further operable to cause the communication module to send a response communication indicating a detection of the predefined odor to a predefined communication receiver of the communication network, if the predefined odor is detected.

10. The mobile electronic device according to claim 7, wherein the control module is further operable to cause the communication module to send a response communication over the communication network indicating a non-response from the user despite a prompt.

11. The mobile electronic device according to claim 1, wherein the control module is further operable to count time starting at a predetermined time until the predefined odor is detected.

12. The mobile electronic device according to claim 1, wherein the predefined odor comprises at least one odor selected from the group consisting of: cigarette odor, nicotine odor, tar odor, food odor, perfume odor, alcohol odor, drug odor, and oral malodor odor.

13. A method for operating a mobile electronic device, the method comprising:
    a controller of the mobile electronic device initiating a fake incoming call alert on a user interface when a communication is not actually received by the mobile electronic device;
    in response to the fake incoming call alert, receiving a user voice input into a microphone located adjacent to an odor sensor;
    detecting an odor of the user voice input using the odor sensor when the user voice input is received into the microphone; and
    performing a predetermined process, if the odor is a predefined odor.

14. The method according to claim 13, further comprising determining if the odor is the predefined odor.

15. The method according to claim 13, wherein the predefined odor comprises at least one odor selected from the group consisting of: cigarette odor, nicotine odor, tar odor, food odor, perfume odor, alcohol odor, drug odor, and oral malodor odor.

16. The method according to claim 13, further comprising a scheduler mode prompting the user to speak into the microphone.

17. The method according to claim 13, further comprising:
    sending a response communication through a communication network if the predefined odor is detected.

18. A mobile electronic device comprising:
    a control module operable to initiate a fake incoming call alert when a communication is not actually received by the mobile electronic device;
    a microphone operable to receive a user voice input in response to the fake incoming call alert;
    an odor sensor located adjacent to the microphone, and operable to detect at least one predefined odor of the user voice input when the microphone is receiving the user voice input;

a communication module operable to perform a communication with a different electronic device; and the control module operable to perform a predetermined process if the at least one predefined odor is detected.

19. The mobile electronic device of claim 18, wherein the control module causes the communication module to send a result of the odor sensor to the different electronic device.

* * * * *